United States Patent
Chen et al.

(10) Patent No.: US 10,817,037 B2
(45) Date of Patent: Oct. 27, 2020

(54) DEVICE FOR MANAGING POWER SUPPLY AND METHOD THEREFOR

(71) Applicant: NANNING FUGUI PRECISION INDUSTRIAL CO., LTD., Nanning (CN)

(72) Inventors: Hung-Ta Chen, New Taipei (TW); Chuan-Cheng Hsu, Hsin-chu (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 323 days.

(21) Appl. No.: 15/876,113

(22) Filed: Jan. 20, 2018

(65) Prior Publication Data

US 2019/0227608 A1 Jul. 25, 2019

(51) Int. Cl.
| | | |
|---|---|---|
| *G06F 1/30* | (2006.01) | |
| *G06F 1/26* | (2006.01) | |
| *H04L 12/10* | (2006.01) | |
| *G06F 1/28* | (2006.01) | |
| *H02J 3/00* | (2006.01) | |

(52) U.S. Cl.
CPC ............ *G06F 1/263* (2013.01); *G06F 1/28* (2013.01); *G06F 1/30* (2013.01); *H04L 12/10* (2013.01); *H02J 3/00* (2013.01)

(58) Field of Classification Search
CPC ... G06F 1/263; G06F 1/28; G06F 1/30; G06F 1/3209; G06F 1/3287; G06F 1/305; H02J 3/00; H04L 12/10
See application file for complete search history.

(56) References Cited

U.S. PATENT DOCUMENTS

| | | | | |
|---|---|---|---|---|
| 5,315,161 | A * | 5/1994 | Robinson | G06F 1/30 307/66 |
| 5,652,893 | A * | 7/1997 | Ben-Meir | G06F 1/3215 713/300 |
| 8,250,381 | B2 * | 8/2012 | Hansalia | G06F 1/266 307/35 |
| 8,674,546 | B1 * | 3/2014 | Dix | H04L 12/10 307/65 |
| 9,256,263 | B1 * | 2/2016 | Narayanan | G06F 1/30 |
| 2005/0136989 | A1 * | 6/2005 | Dove | G06F 1/266 455/572 |
| 2006/0053324 | A1 * | 3/2006 | Giat | H04L 12/10 713/300 |

(Continued)

FOREIGN PATENT DOCUMENTS

| | | |
|---|---|---|
| CN | 1794636 A | 6/2006 |
| CN | 104219062 A | 12/2014 |
| CN | 106341237 A | 1/2017 |

*Primary Examiner* — Jaweed A Abbaszadeh
*Assistant Examiner* — Brian J Corcoran
(74) *Attorney, Agent, or Firm* — ScienBiziP, P.C.

(57) ABSTRACT

A method for managing a power supply comprises an Extension Power over Ethernet System receiving a trigger event. A determination is made as to whether the trigger event would cause a power budget of a power supply management device to increase or decrease; if the power is increased, the power is provided to a switch with a higher priority; if the power is decreased, power can be provided to a switch with a higher priority from a lower priority. A device for power supply management is also disclosed, the method and the device can effectively allocate power as required and avoid equipment overload.

6 Claims, 10 Drawing Sheets

(56) References Cited

U.S. PATENT DOCUMENTS

| | | | |
|---|---|---|---|
| 2008/0168283 A1* | 7/2008 | Penning | G06F 1/263 713/310 |
| 2009/0217088 A1* | 8/2009 | Diab | G06F 11/2015 714/14 |
| 2009/0235093 A1* | 9/2009 | Diab | G06F 1/30 713/300 |
| 2014/0129855 A1* | 5/2014 | Hamdi | H04L 12/413 713/320 |
| 2014/0215254 A1* | 7/2014 | Mandava | G06F 11/3058 713/340 |

* cited by examiner

| State | PoE AC Drop | Power Budget | Action |
|---|---|---|---|
| DELIVER | No | Yes | ON |
| HOLD_ON | Yes | Yes | ON |
| MONITOR | No | No | ON |
| TURNDOWN | Yes | No | OFF |

FIG.5

DEVICE FOR MANAGING POWER SUPPLY AND METHOD THEREFOR

FIELD

The subject matter herein generally relates to communication technologies, and in particular, to a power management method of a Power over Ethernet (PoE) switch.

BACKGROUND

An Extension PoE System (EPS) is used to provide additional power to a Power Sourcing Equipment (PSE) switch, such as a PoE switch. The EPS can allocate power to the PoE switch on a budget or recycle the power from the PoE switch which is budgeted.

However, the EPS has following disadvantages. The EPS has a plurality of Power Supply Units (PSUs) that can supply power to multiple PoE switches, and power budget of each PSU is fixed. When one of the PoE switches no longer needs to be powered by its PSU, power from the PSU cannot be reconfigured and supplied to other PoE switches. Priorities of power ports corresponding to each PSU of the EPS are preset and cannot be changed by an administrator. Furthermore, when one of the PSUs fails to provide power to its PoE switch, the PoE switch does not receive any warning notification, and an Over Current Protection (OCP) system then restarts the PoE switch.

BRIEF DESCRIPTION OF THE DRAWINGS

Implementations of the present technology will now be described, by way of example only, with reference to the attached figures, wherein:

FIG. 5 is a block diagram of one embodiment of working states of the PoE switch.

DETAILED DESCRIPTION

Figure 1:
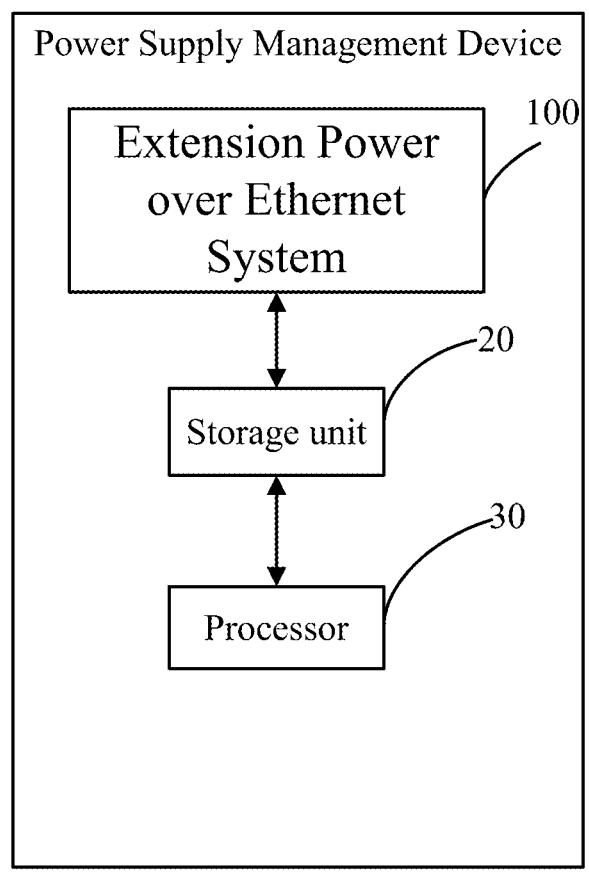
FIG. 1 is a block diagram of one embodiment of a power supply management device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 shows one embodiment of a power supply management device 50. The power supply management device 50 further includes the EPS 100, a storage unit 20, and a processor 30.

Figure 2:
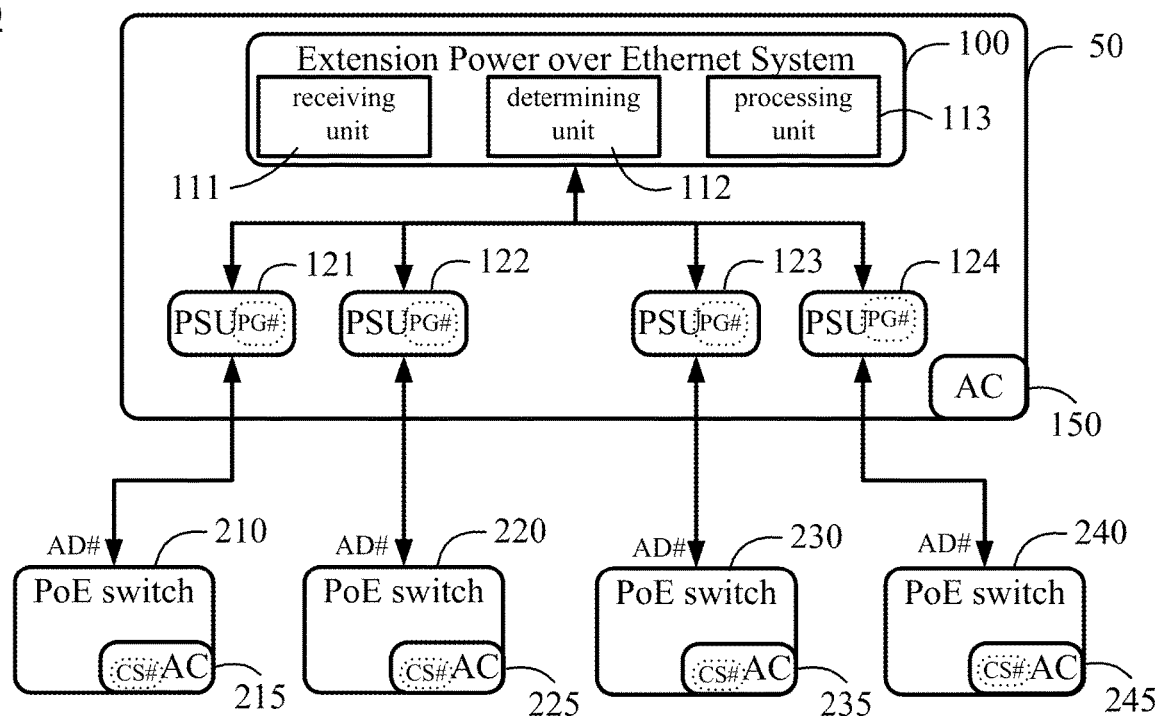
FIG. 2 is a block diagram of one embodiment of a power supply management system.

FIG. 2 illustrates an embodiment of a power supply management system 10.

In the embodiment, the power supply management system 10 includes a power management device 50 and multiple PoE switches, for example, the PoE switches 210, 220, 230, and 240. The power management device 50 includes at least an EPS 100, PSUs 121, 122, 123, and 124, and an Alternating Current (AC) power source 150. The EPS 100 further includes a receiving unit 111, a determining unit 112, and a processing unit 113. The PoE switches 210, 220, 230 and 240 have the AC power sources 215, 225, 235 and 245 respectively.

In addition, Power Supply Ports (PSP) (not shown) of each of the power supply units 121, 122, 123 and 124 are given different priority levels. For example, the power supply priority of the power supply port (not shown) of the PSU 121 is higher than the power supply priority of the power supply port (not shown) of the PSU 124, the power supply priority of the power supply port (not shown) of the PSU 124 is higher than the power supply priority of the power supply port (not shown) of the PSU 122, and the power supply priority of the power supply port (not shown) of the PSU 122 is higher than the power supply priority of the power supply port (not shown) of the PSU 123 (1>4>2>3).

In this embodiment, the EPS 100 receives trigger events, including a priority event (# AD), a power outage event (# CS), and a power-on event (# PG), from different devices.

The priority event (# AD) refers to priority statuses of the PoE switches 210, 220, 230, and 240.

The power outage event (# CS) refers to the PoE switches 210, 220, 230, and 240 which have lost the AC power supply.

Figure 3:
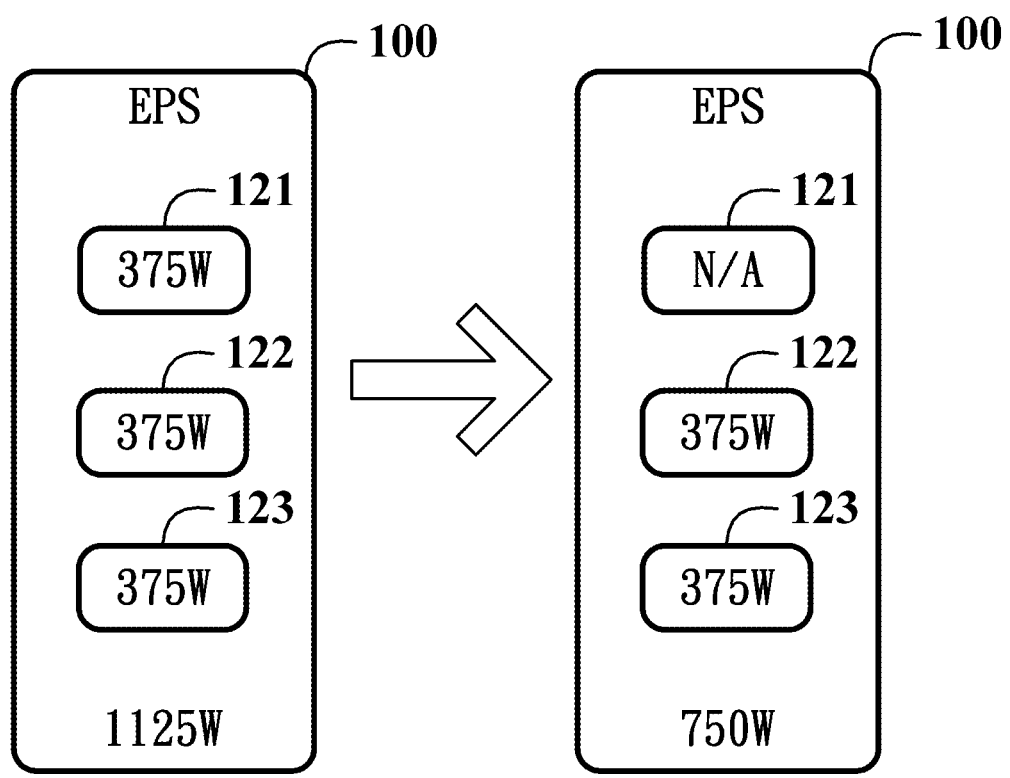
FIG. 3 is a block diagram of one embodiment of budget variations when a power supply unit is inserted in or removed from the power supply device.

In the embodiment, referring to FIG. 3, the power event (# PG) refers to the one or more of the PSUs 210, 220, and 230 which are inserted in or removed from the power management device 50. For example, each of the PSUs has power budget with a 54 volt (V) and 375 watt (W) to the PoE switches. When all the power supply units 121, 122, and 123 are installed in the power management device 50, the total power is 1125 W. When the PSU 121 is removed from the power management device 50, the total power is 750 W.

Figure 4A:
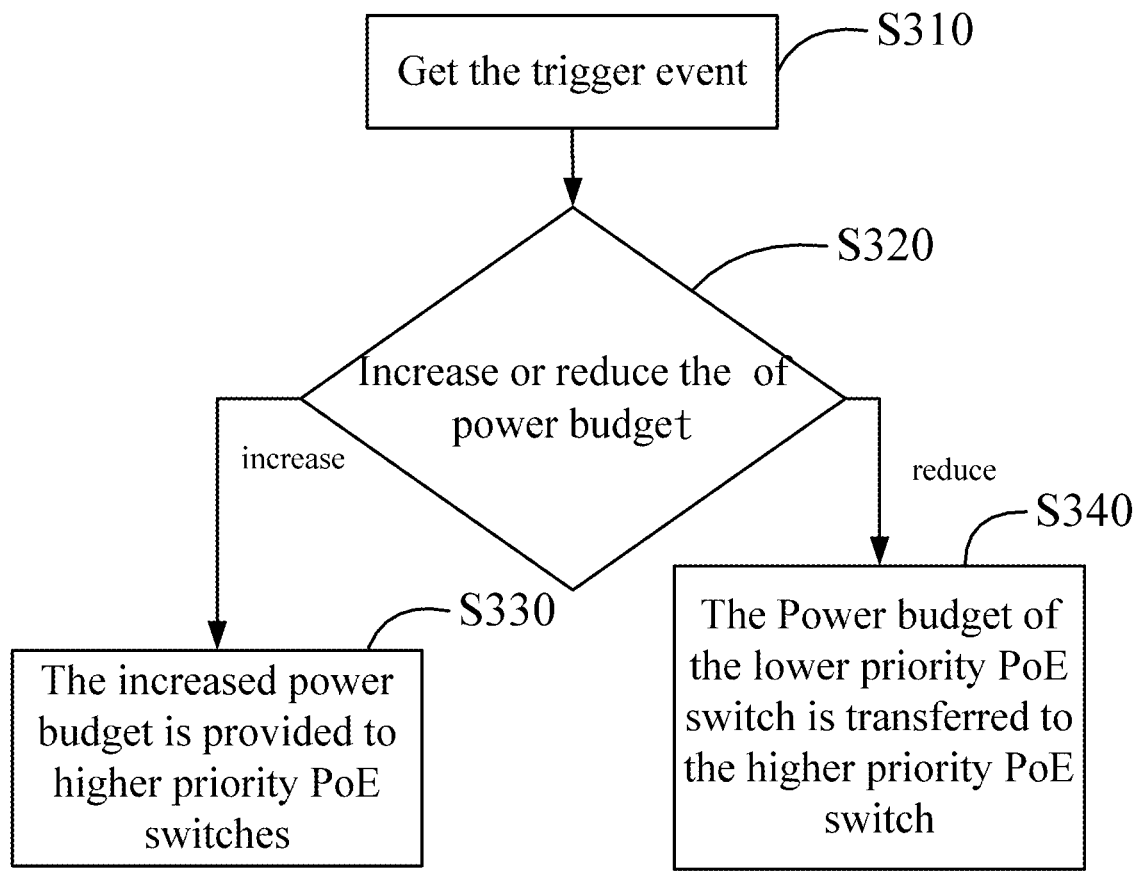
FIG. 4A is a flowchart of one embodiment of power budget configuration.

FIG. 4A illustrates a flowchart of an exemplary embodiment of power budget configuration.

Figure 4B:
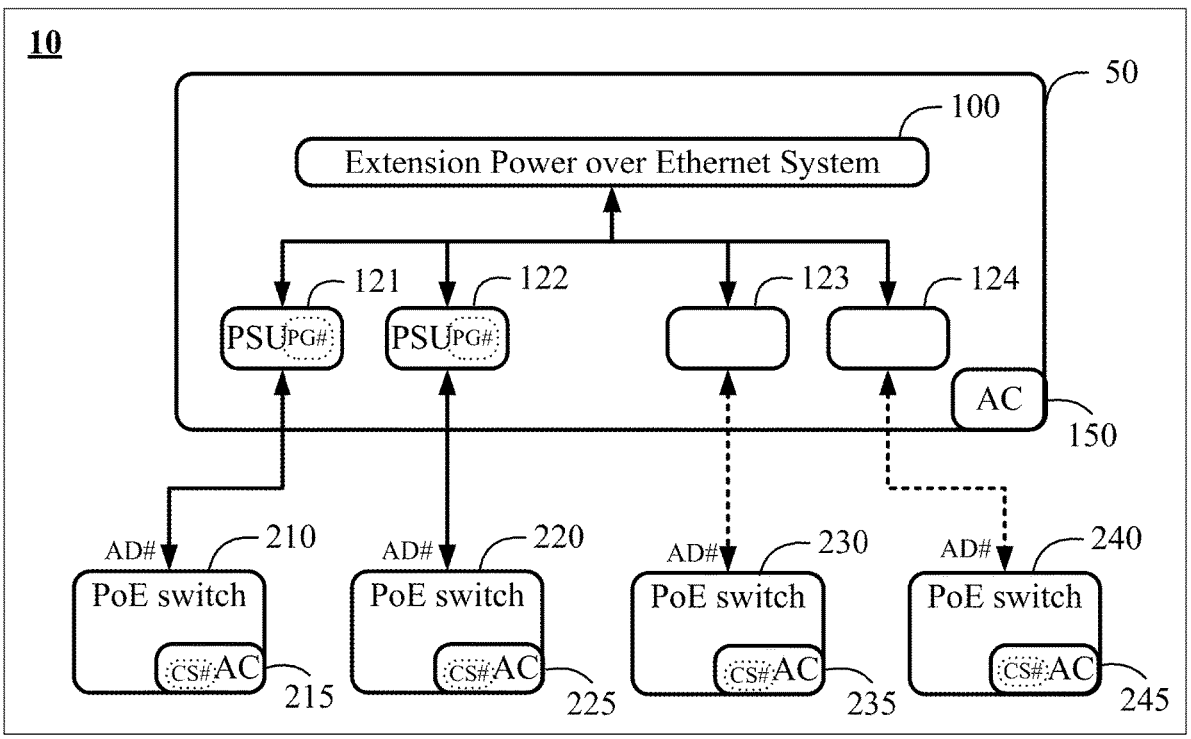
FIG. 4B to 4D are block diagrams of one embodiment of power budget configuration.

In this embodiment, referring to FIG. 2, the EPS 100 initially only includes the PSUs 121 and 122, as shown in FIG. 4B.

At block 310, the receiving unit 111 obtains a triggering event from the EPS 100. For example, the triggering event refers to installing a PSU in or removing a PSU from the power management device 50, or a PSU failing to supply power due to malfunction.

At block 320, the determining unit 112 determines whether the power budget is increased or decreased by the trigger event.

Figure 4C:
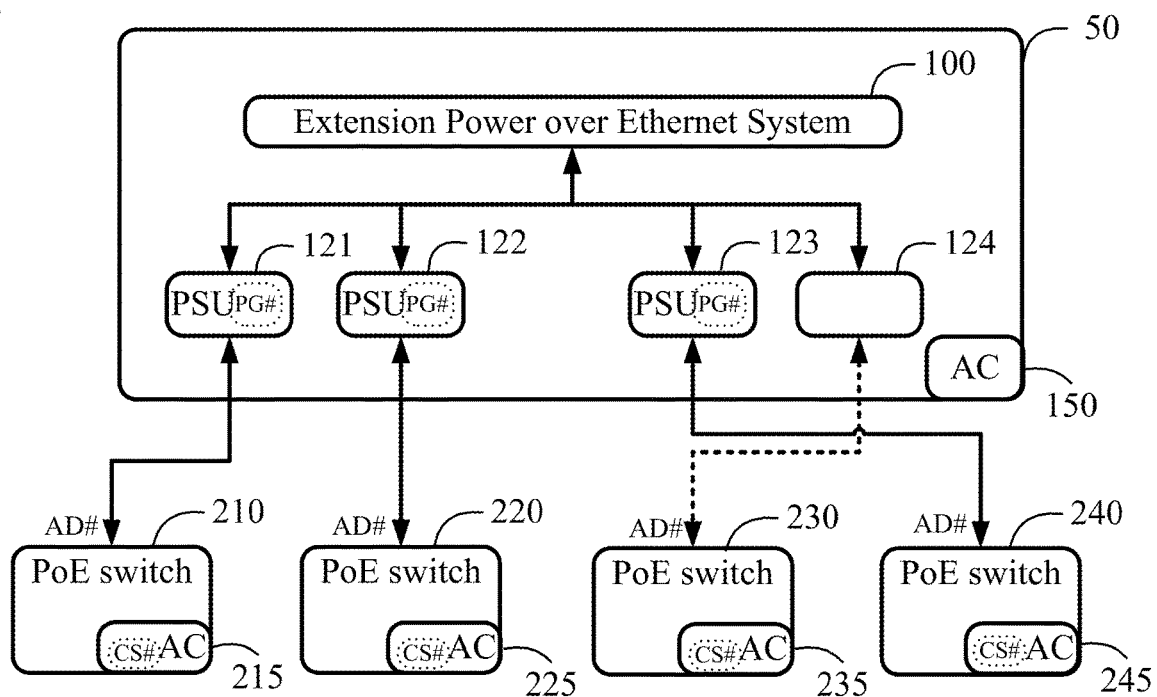

At block 330, when the power budget is increased due to the PSU 123 being installed in the power management device 50, since the PSP (not shown) of the PSU 124 has a higher power priority than the PSP (not shown) of the PSU 123, the processing unit 113 transfers the budgeted power of the PSU 123 to the PSU 124 to reallocate the power budget of the PSU 123 to the PoE switch 240, as shown in FIG. 4C.

Figure 4D:
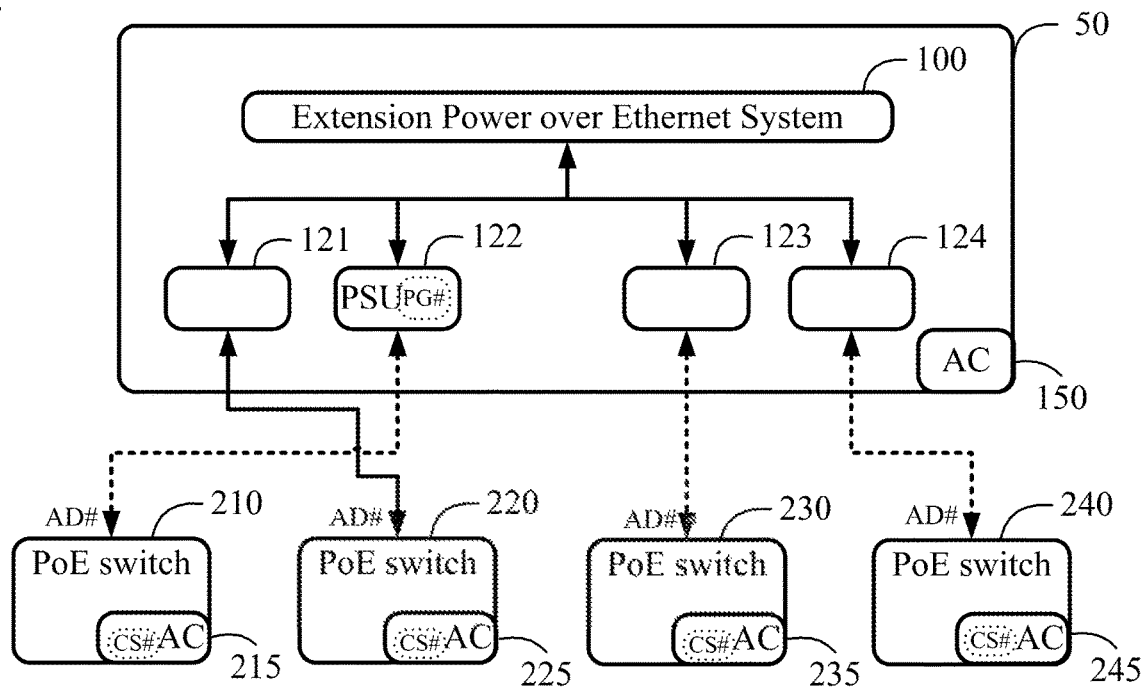

At block 340, when the power budget is decreased due to the PSU 121 being removed from the power management device 50, since the PSP (not shown) of the PSU 121 has a higher priority than the PSP (not shown) of the PSU 122, the processing unit 113 transfers the budgeted power of the PSU 122 to the PSU 121 to reallocate the power budget of the PSU 122 to the PoE switch 210, as shown in FIG. 4D.

FIG. 5 illustrates a block diagram of an embodiment of working states of a PoE switch.

The working states PoE switch include a delivering status (DELIVER), a suspended status (HOLD_ON), a monitoring status (MONITOR) and a turn-off status (TURNDOWN).

The DELIVER status indicates that the PoE switch does not lose the AC power, (AC_Drop=No), continues to receive the 54V power budget from the power management device 50 (Power_Budget=Yes), and is capable of receiving the 54V power (Action=ON).

The HOLD_ON state indicates that the PoE switch has dropped the AC power (AC_Drop=Yes), receives the 54V budgeted power from the power management device 50 (Power_Budget=Yes), and is capable of receiving the 54V power (Action=ON). When the 12V power is dropped, the PoE switch enters the HOLD_ON state, while EPS 100 enables the power management 50 to continue providing the 54V power to the PoE switch and maintains the power for 5 more minutes.

The MONITOR status indicates that the PoE switch does not drop the AC power (AC_Drop=No), and does not receive the 4V budgeted power from the power management 50 (Power_Budget=No), but is capable of receiving the 54V power (Action=ON).

The TURNDOWN state indicates that the PoE switch has dropped the AC power drop (AC_Drop=Yes), does not receive the 54V budgeted power from the power management 50 (Power_Budget=No), and is incapable of receiving the 54V power (Action=OFF). When the PoE switch enters the HOLD_ON state, the EPS 100 provides the 54V power to the PoE switch. When the 12V power of the PoE switch is not resumed during the five minutes, the EPS 100 recycles the 54V power, and the PoE switch enters the TURNDOWN state. At the same time, the recycled 54V power can be provided to other PoE switches.

Figure 6:
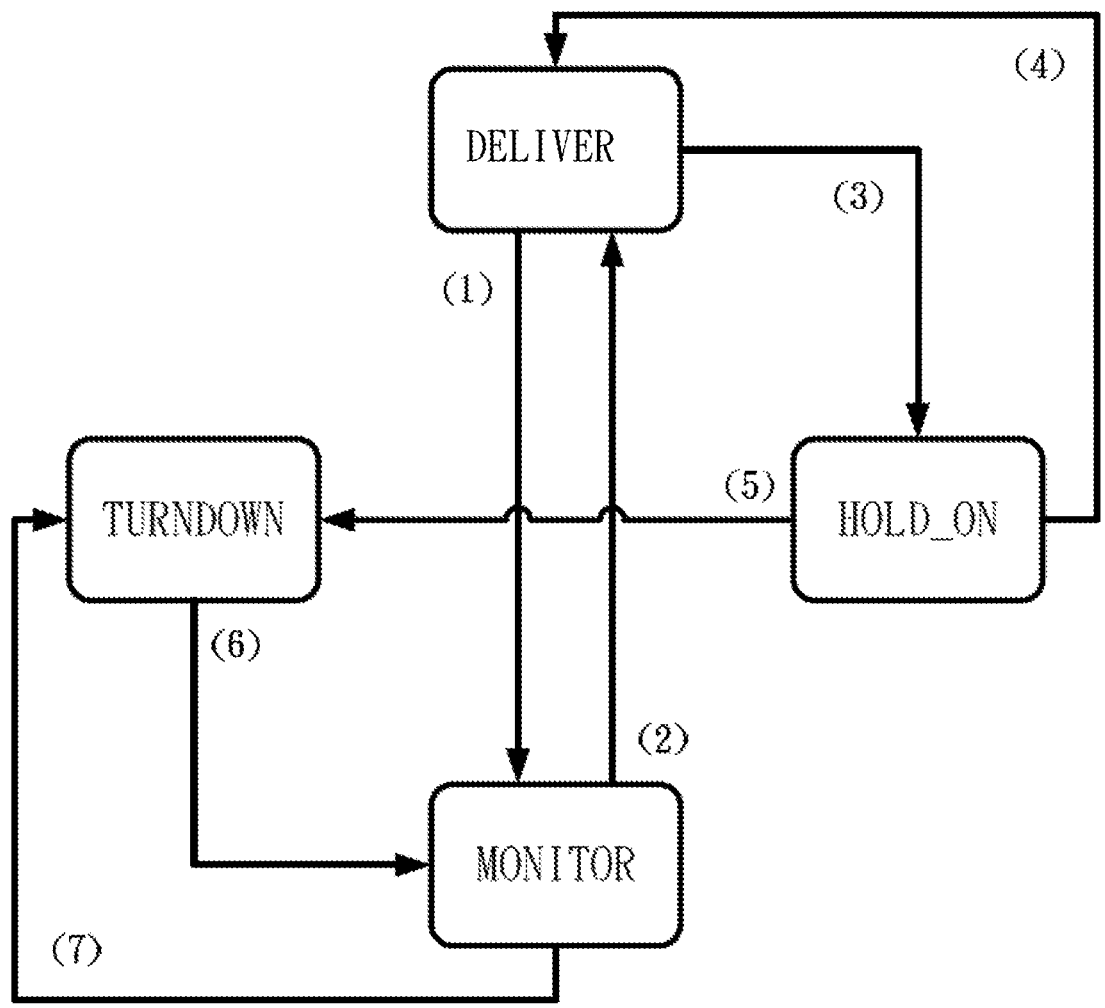
FIG. 6 is a block diagram of one embodiment of switch states of the PoE switch.

FIG. 6 illustrates a block diagram of an embodiment of switch states of the PoE switch.

When the PSU 121 is removed and the 54V power supply drops, the PoE switch enters the MONITOR state from the DELIVER state.

When the PSU 121 is installed to obtain the 54V power supply, the PoE switch enters the DELIVER state from the MONITOR state.

When the AC power is dropped, the PoE switch 210 enters the HOLD_ON state from the DELIVER state.

When the AC power is recovered/resumed, the PoE 210 switch enters the DELIVER state from the HOLD_ON state.

When the AC power of the PoE switch 210 is dropped and enters the HOLD_ON state, when the 12V power is not recovered during the 5 minutes, the 54 V power is recycled and the TURN DOWN state is entered. At the same time, the recycled 54V power can be used by other PoE switches.

When the 12V power is recovered, but the 54V power is not recovered, then the PoE switch enters MONITOR state from TURNDOWN state.

The PoE switch may enter the TURNDOWN state from the MONITOR state for exceptional conditions.

Figure 7:
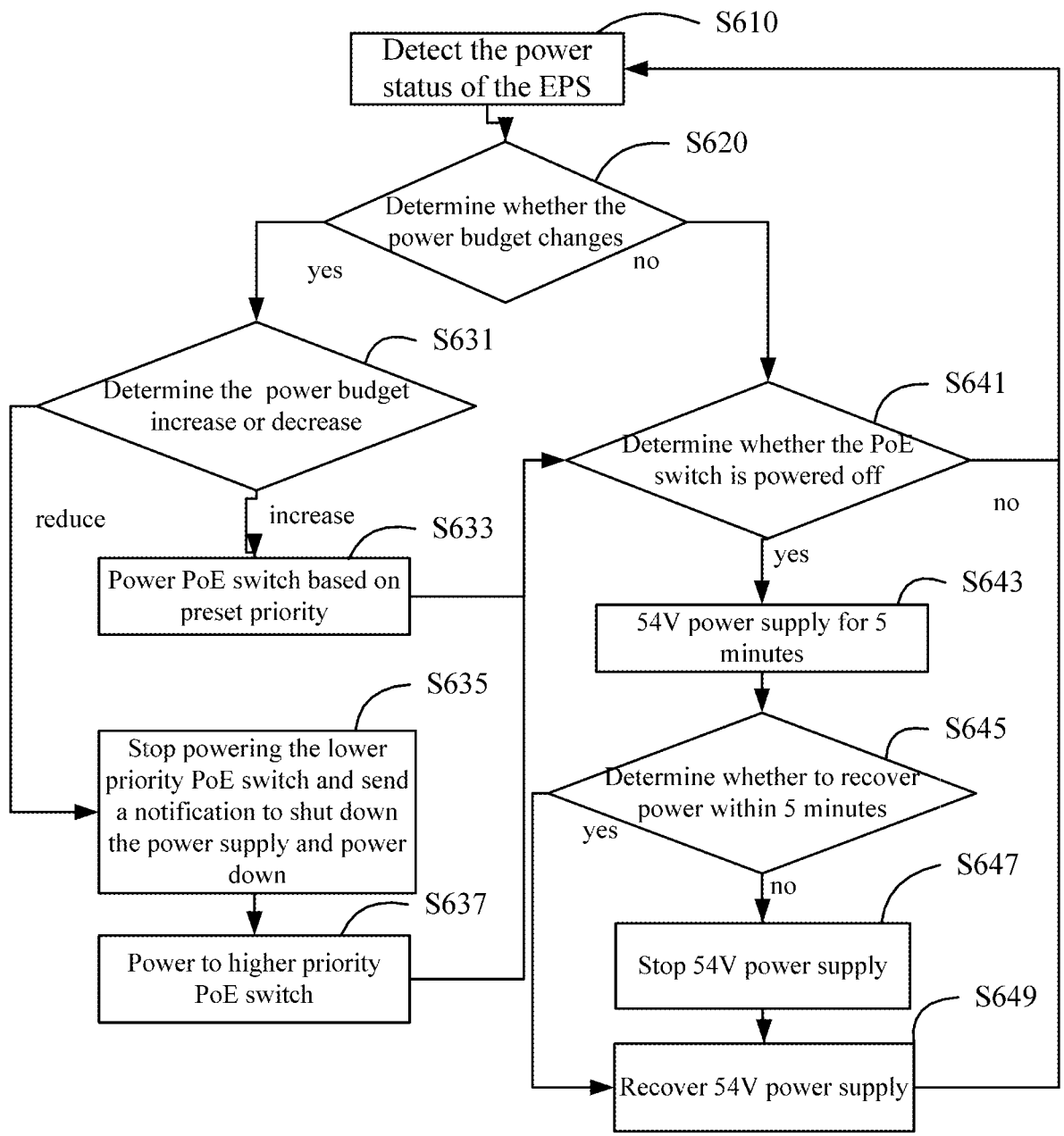
FIG. 7 is a flowchart of one embodiment of a power supply management method.

FIG. 7 illustrates a flowchart of an exemplary embodiment of steps of a power supply management method. Referring to FIG. 2, the method is applied to the EPS 100. The function modules 111-113, as FIG. 2 illustrates, are executed by the processor 10. Each block shown in FIG. 7 represents one or more processes, methods, or subroutines, carried out in the exemplary method. Additionally, the illustrated order of blocks is by example only and the order of the blocks can be changed. The method can begin at block 610.

The power management device 50 includes at least the EPS 100 and the PSUs 121, 122 and 123 and the AC power source 150. The PoE switches 210, 220, and 230 have the AC power sources 215, 225, and 235, respectively, and are respectively connected to the EPS 100 via the PSPs (not shown) of the PSUs 121, 122, and 123. In other words, PSU 121 defaults to provide the 54V power to the PoE switch 210, PSU 122 defaults to provide the 54V power to the PoE switch 220, and the PSU 123 defaults to provide the 54V power to the PoE switch 230, in addition, a different priority level is given to each of the PSP (not shown) of the PSUs 121, 122, and 123. The following is a brief description of the process, this is illustrated by the priority of the PSUs, for example, the PSP (not shown) of the PSU 121 has the highest priority, the PSP (not shown) of the PSU 122 has medium priority, and the PSP (not shown) of the PSU 123 has the lowest priority.

Referring to FIG. 1, the following embodiments are based on the assumption that the EPS 100 currently only includes the PSUs 121 and 122. At this time, the PSU 121 supplies the 54V power to the first PoE switch 210 via the PSP (not shown), the PSU 122 supplies the 54V power to the second PoE switch 220 via the PSP (not shown), and the third PoE switch 230 is not supplied with the 54V power.

At block 610, the receiving unit 111 detects the power supply status of the EPS 100.

At block 620, the determining unit 112 determines whether there is a change in the power budget of the EPS 100. If there is no change, the block 641 is executed.

At block 631, if the change occurs, the determining unit 112 then determines that the power budget of the EPS 100 is increased or decreased.

At block 633, when the power budget is increased due to the PSU 123 is installed in the power supply management device 50, the processing unit 113 transfers the increased power budget to the PoE switch connected to the PSP (not shown) with a higher priority. For example, the PoE switch 240.

At block 635, when the power budget is decreased due to the PSU 121 is removed from the power supply management device 50. At this time, only the PSU 122 is powered. Since the PSP (not shown) of the PSU 121 has a higher priority, the PSP (not shown) of the PSU 122 with the lower priority needs to be stopped powering. Therefore, before the power is turned off, the processing unit 113 sends a notification message to the second PoE switch 220, so that the second PoE switch 220 can shut down power receiving device in advance, then cut off the power.

At block 637, the processing unit 113 provides the currently remaining power budget to the PSP (not shown) of the PSU 121 with the higher priority so that the PSU 121 can supply the 54V power to the PoE switch 210.

At block 641, the determining unit 112 determines whether there is the AC power broken of the PoE switch. If no AC power of any PoE switch is broken, then the block 610 is returned.

At block 643, when the receiving unit 111 detects that the AC power of one of the PoE switches, for example, the second PoE switch 220 drops, the processing unit instructs the PSU 122 to reserve the 54V power for the second PoE switch 220 for five minutes.

At block 645, the determining unit 112 determines whether the second PoE switch 220 resumes the power supply of the AC power in five minutes.

At block 647, when the AC power of the second PoE switch 220 does not recover within more than 5 minutes, the PSU 122 of the processing unit 113 stops supplying the 54V power to the second PoE switch 220.

At block 649, when the AC power of the second PoE switch 220 resumes power supply within 5 minutes, the processing unit 113 causes the PSU 122 supplying the 54V power to the second PoE switch 220.

The power management method and device improve the power supply mechanism of the EPS, so that the EPS can effectively distribute power to the required equipment and when the power supply module of the EPS is stopping the power supply can protect the normal power supply.

The embodiments shown and described above are only examples. Many details are often found in the art such as the other features of a device and method for vehicle warning. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A power supply management method, which is applied to a power supply management device, wherein the power supply management device comprises a first power supply port connected to a first Power over Ethernet (PoE) switch, a second power supply port connected to a second PoE switch, a third power supply port connected to a third PoE switch, and a fourth power supply port connected to a fourth PoE switch, the power supply management device is installed at least a first power supply unit and a second power supply unit, the first power supply unit supplies power to the first PoE switch via the first power supply port, and the second power supply unit supplies power to the second PoE switch via the second power supply port, the first power supply port has a higher priority than the fourth power supply port, the fourth power supply port has a higher priority than the second power supply port, the second power supply port has a higher priority than the third power supply port, and the power supply management device comprises an extension power over Ethernet system (EPS), the power supply management method comprising:

obtaining a trigger event from the EPS of the power supply management device;

determining whether power budget of the power supply management device is increased or decreased according to the trigger event;

when the power budget of the power supply management device is increased due to a third power supply unit installed in the power supply management device, since the fourth power supply port has a higher priority than the third power supply port, transferring the power budget of the third power supply unit to the fourth power supply port to provide the power budget of the third power supply unit to the fourth PoE switch;

when the power budget of the power supply management device is decreased due to the first power supply unit removed from the power supply management device, since the priority of the first power supply port is higher than that of the second power supply port, transferring the power budget of the second power supply unit to the first power supply port to provide the power budget of the second power supply unit to the first PoE switch;

when a working state of the first PoE switch is a delivering state, wherein the delivering state indicating that the first PoE switch does not drop an Alternating Current (AC) power, receives the power budget and is capable of receiving a 54 volt (V) power, if the first power supply unit is removed from the power supply management device, the working state of the first PoE switch is changed into a monitoring state, wherein the monitoring state indicating that the first PoE switch does not drop the AC power, does not receive the power budget and is capable of receiving the 54 V power, and, if the AC power of the first PoE switch drops, the working state of the first PoE switch is changed into a suspended state, wherein the suspended state indicating that the first PoE switch has dropped the AC power, receives the power budget and is capable of receiving the 54 V power; and when the working state of the first PoE switch is the suspended state, if the AC power of the first PoE switch recovers, the working state of the first PoE switch is changed into the delivering state, and, if the AC power of the first PoE switch does not recover within a preset time, the working state of the first PoE switch is changed into a turn-off state, wherein the turn-off state indicating that the first PoE switch has dropped the AC power, does not receive the power budget and is incapable of receiving the 54 V power.

2. The method as claimed in claim 1, wherein, when the working state of the first PoE switch is the turn-off state, if the AC power of the first PoE switch recovers, the working state of the first PoE switch is changed into the monitoring state.

3. The method as claimed in claim 1, wherein, when the working state of the first PoE switch is the monitoring state, if the power budget is detected to be increased and the first PoE switch receives the power budget, the working state of the first PoE switch is changed into the delivering state.

4. A system for power supply management, executed in a power supply management device, the power supply management device comprises:
- a first power supply port connected with a first Power over Ethernet (PoE) switch;
- a second power supply port connected with a second PoE switch;
- a third power supply port connected with a third PoE switch;
- a fourth power supply port connected with a fourth PoE switch;
- wherein, a priority of the first power supply port is higher than that of the fourth power supply port, the priority of the fourth power supply port is higher than that of the second power supply port, and the priority of the second power supply port is higher than that of the third power supply port;
- the power supply management device further comprises a first power supply unit, supplying power to the first PoE switch via the first power supply port;
- a second power supply unit, supplying power to the second PoE switch via the second power supply port;

the system comprising:
- at least one processor;
- a storage unit; and
- one or more programs that are stored in the storage unit and executed by the at least one processor, the one or more programs comprising instructions for:
- obtaining a triggering event;
- determining that the trigger event causes a power budget of the power supply management device to increase or decrease;
- when the power budget of the power supply management device is increased due to a third power supply unit installed in the power supply management device, since the fourth power supply port has a higher priority than the third power supply port, transferring the power budget of the third power supply unit to the fourth power supply port to provide the power budget of the third power supply unit to the fourth PoE switch;
- when the power budget of the power supply management device is decreased due to the first power supply unit removed from the power supply management device, since the priority of the first power supply port is higher than that of the second power supply port, transferring the power budget of the second power supply unit to the first power supply port to provide the power budget of the second power supply unit to the first PoE switch;
- when a working state of the first PoE switch is a delivering state, wherein the delivering state indicating that the first PoE switch does not drop an Alternating Current (AC) power, receives the power budget and is capable of receiving a 54 volt (V) power, if the first power supply unit is removed from the power supply management device, the working state of the first PoE switch is changed into a monitoring state, wherein the monitoring state indicating that the first PoE switch does not drop the AC power, does not receive the power budget and is capable of receiving the 54 V power, and, if the AC power of the first PoE switch drops, the working state of the first PoE switch is changed into a suspended state, wherein the suspended state indicating that the first PoE switch has dropped the AC power, receives the power budget and is capable of receiving the 54 V power; and
- when the working state of the first PoE switch is the suspended state, if the AC power of the first PoE switch recovers, the working state of the first PoE switch is changed into the delivering state, and if the AC power of the first PoE switch does not recover within a preset time, the working state of first PoE switch is changed into a turn-off state, wherein the turn-off state indicating that the first PoE switch has dropped the AC power, does not receive the power budget and is incapable of receiving the 54 V power.

5. The system as claimed in claim 4, wherein, when the working state of the first PoE switch is the turn-off state, if the AC power of the first PoE switch recovers, the working state of the first PoE switch is changed into the monitoring state.

6. The system as claimed in claim 4, wherein, when the working state of the first PoE switch is the monitoring state, if the power budget is detected to be increased and the first PoE switch receives the power budget, the working state of the first PoE switch is changed into the delivering state.

* * * * *